US011196880B2

(12) United States Patent
Fujisawa

(10) Patent No.: US 11,196,880 B2
(45) Date of Patent: Dec. 7, 2021

(54) SYSTEM, PRINTING METHOD, AND INFORMATION PROCESSING APPARATUS

(71) Applicant: SEIKO EPSON CORPORATION, Tokyo (JP)

(72) Inventor: Takatoshi Fujisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/901,236

(22) Filed: Jun. 15, 2020

(65) Prior Publication Data
US 2020/0404110 A1 Dec. 24, 2020

(30) Foreign Application Priority Data
Jun. 18, 2019 (JP) .............................. JP2019-112560

(51) Int. Cl.
*H04N 1/00* (2006.01)
*G06F 3/16* (2006.01)
*G06F 3/12* (2006.01)

(52) U.S. Cl.
CPC ....... *H04N 1/00403* (2013.01); *G06F 3/1204* (2013.01); *G06F 3/167* (2013.01)

(58) Field of Classification Search
CPC ... H04N 1/00403; G06F 3/167; G06F 3/1024; G06F 3/1268; G06F 3/1205; G06F 3/1228; G06F 3/1288; G10L 15/22; G10L 2015/223
USPC .......................................... 358/1.15; 704/235
See application file for complete search history.

(56) References Cited

U.S. PATENT DOCUMENTS

| 10,665,238 B1 * | 5/2020 | Bermudez-Cisneros ................... G10L 15/1822 |
| 2015/0317109 A1 | 11/2015 | Kirihata |
| 2016/0035349 A1 * | 2/2016 | Jung ..................... G10L 15/063 704/235 |
| 2017/0289368 A1 * | 10/2017 | Kirihata ................. H04N 1/442 |

FOREIGN PATENT DOCUMENTS

JP 2015-213256 A 11/2015

* cited by examiner

*Primary Examiner* — Neil R McLean
(74) *Attorney, Agent, or Firm* — Workman Nydegger

(57) ABSTRACT

A printing system includes a printing apparatus and an information processing apparatus coupled to the printing apparatus through a network. The information processing apparatus has: a storage that stores registration information in correspondence with the identification information of a user, the registration information including at least one of a content corresponding to a keyword and acquired-from source information representing a source from which the content was acquired; a keyword acquiring section that acquires the keyword included in a print command by voice and the identification information linked to the keyword from a voice relay apparatus; and a transmitting section that creates print data that uses the content that is associated with the acquired identification information and corresponds to the keyword acquired by the keyword acquiring section, and transmits the print data to the printing apparatus. The printing apparatus receives the print data and executes printing according to the print data.

10 Claims, 14 Drawing Sheets

FIG. 3

| SETTING NAME | XXX NEWS |
| --- | --- |
| USER ID | UID1 |
| KEYWORD | ACCUSTOMED NEWS |
| PRINTING CONDITION | (NONE) |
| CONTENT | http://example.com/news/print/ |
| PRINT SETTING | (DEFAULT) |

| SETTING NAME | TODAY'S WEATHER |
| --- | --- |
| USER ID | UID2 |
| KEYWORD | WEATHER, WEATHER FORECAST |
| PRINTING CONDITION | 6:00 TO 9:00 EVERY DAY |
| CONTENT | http://example1.co.jp/nagano/weather.htm |
| PRINT SETTING | A4-SIZE, 2 COPIES, MONOCHROME |

| SETTING NAME | TOMORROW'S WEATHER |
| --- | --- |
| USER ID | UID2 |
| KEYWORD | WEATHER, WEATHER FORECAST |
| PRINTING CONDITION | 18:00 TO 21:00 EVERY DAY |
| CONTENT | http://example1.co.jp/nagano/forecast.htm |
| PRINT SETTING | B5-SIZE, 1 COPY, MONOCHROME |

| SETTING NAME | NATIONAL WEATHER |
| --- | --- |
| USER ID | UID2 |
| KEYWORD | WEATHER, WEATHER FORECAST |
| PRINTING CONDITION | FRIDAY EVERY WEEK |
| CONTENT | http://example1.co.jp/japan/forecast.htm |
| PRINT SETTING | A4-SIZE, 1 COPY, COLOR |

| SETTING NAME | COLORING BOOK |
| --- | --- |
| USER ID | UID3 |
| KEYWORD | COLORING BOOK |
| PRINTING CONDITION | (NONE) |
| CONTENT | coloring.bmp |
| PRINT SETTING | A4-SIZE, 1 COPY, MONOCHROME |

FIG. 8

REGISTRATION SCREEN 600

| | | |
|---|---|---|
| SETTING NAME: | TODAY'S WEATHER | 601 |
| USER ID: | UID2 | 602 |
| KEYWORD: | WEATHER, WEATHER FORECAST | 603 |
| PRINTING CONDITION: | 6:00 TO 9:00 EVERY DAY | 604 |
| CONTENT: | http://example1.co.jp/nagano/weather.htm | 605 |
| PRINT SETTING: | A4-SIZE, 2 COPIES, MONOCHROME | 606 |

END — 607

FIG. 11

MANAGEMENT INFORMATION IM10

| USER NAME | XX XX |
|---|---|
| USER ID | UID2 |
| ADDRESS | NAGANO PREFECTURE |

— UID
— IM11
— IM11

| CURRENT LOCATION | NAGANO PREFECTURE |
|---|---|

— IM11

SCHEDULE TABLE

| PLANNED DATE AND TIME | PLANED LOCATION |
|---|---|
| JUNE 1, 9:00 TO JUNE 2, 21:00 | TOKYO |
| JUNE 8, 8:00 TO JUNE 8, 22:00 | AICHI PREFECTURE |
| JUNE 15, 9:00 TO JUNE 16, 21:00 | OSAKA PREFECTURE |
| ... | ... |

| DATE-AND-TIME IDENTIFICATION KEYWORDS KE1 |
|---|
| CURRENT <br> ⋮ <br> TOMORROW, <br> DAY AFTER TOMORROW, <br> ⋮ <br> MONDAY <br> TUESDAY <br> ⋮ <br> 1ST <br> 2ND <br> ⋮ <br> 1 O'CLOCK <br> 2 O'CLOCK <br> ⋮ |

FIG. 13

| | | |
|---|---|---|
| SETTING NAME | WEATHER FORECAST AT DESTINATION | ← IM0 |
| USER ID | UID2 | ← UID |
| KEYWORD | WEATHER, WEATHER FORECAST | ← KE2, KE3 |
| PRINTING CONDITION | (NONE) | |
| CONTENT | SCHEDULED TABLE → http://example1.co.jp/ | ← IM2 |
| PRINT SETTING | A4-SIZE, 1 COPY, MONOCHROME | ← PS1 / IM1 |
| SETTING NAME | TRAFFIC INFORMATION AT DESTINATION | ← IM0 |
| USER ID | UID2 | ← UID |
| KEYWORD | TRAFFIC, TRAFFIC INFORMATION | ← KE2, KE3 |
| PRINTING CONDITION | (NONE) | |
| CONTENT | SCHEDULED TABLE → http://example2.com/traffic/ | ← IM2 |
| PRINT SETTING | A4-SIZE, 1 COPY, COLOR | ← PS1 / IM1 |
| SETTING NAME | MAP AT DESTINATION | ← IM0 |
| USER ID | UID2 | ← UID |
| KEYWORD | MAP | ← KE2, KE3 |
| PRINTING CONDITION | (NONE) | |
| CONTENT | SCHEDULED TABLE → http://example3.com/map/ | ← IM2 |
| PRINT SETTING | A3-SIZE, 1 COPY, COLOR | ← PS1 / IM1 |

(TA1)

SYSTEM, PRINTING METHOD, AND INFORMATION PROCESSING APPARATUS

The present application is based on, and claims priority from JP Application Serial Number 2019-112560, filed Jun. 18, 2019, the disclosure of which is hereby incorporated by reference herein in its entirety.

BACKGROUND

1. Technical Field

The present disclosure relates to a printing system that includes a printing apparatus and an information processing apparatus, a printing method, and the information processing apparatus.

2. Related Art

Recent server computers provide a cloud printing service to have a printer execute printing.

Smart speakers that work in cooperation with a voice recognition service on a cloud are also commercially available in recent years.

JP-A-2015-213256 cited for reference purposes discloses a printing system in which an image forming apparatus and a client personal computer (PC) are coupled together through a local area network (LAN). The voice-using user in this printing system needs to enter print data from the client PC into the image forming apparatus and then needs to go to the image forming apparatus. After that, the user can hear, from the image forming apparatus, a voice indicating a start of printing, a selection of a function, or the like, after which the user can cause the image forming apparatus to execute a copy function, a box function, or another particular function through a voice.

With the technology described above, it is not possible to use a voice to command the client PC to perform printing.

Particularly, to meet the demand of a user who uses a smart speaker that has been now commercially available for printing, it is necessary to specify a content to be printed for each user through a voice.

SUMMARY

A printing system in the present disclosure has an aspect in which the printing system includes a printing apparatus and an information processing apparatus coupled to the printing apparatus through a network. The information processing apparatus has: a storage that stores registration information in correspondence with the identification information of a user, the registration information including at least one of a content corresponding to a keyword and acquired-from source information representing a source from which the content was acquired; a keyword acquiring section that acquires the keyword included in a print command by voice and the identification information linked to the keyword from a voice relay apparatus; and a transmitting section that creates print data that uses the content that is associated with the acquired identification information and corresponds to the keyword acquired by the keyword acquiring section, and transmits the print data to the printing apparatus. The printing apparatus receives the print data and executes printing according to the print data.

A printing method in the present disclosure has an aspect in which the printing method uses a printing apparatus and an information processing apparatus coupled to the printing apparatus through a network. The printing method has: a storing step of storing registration information in a storage in correspondence with the identification information of a user, the registration information including at least one of a content corresponding to a keyword and acquired-from source information representing a source from which the content was acquired; a keyword acquiring step of acquiring, in the information processing apparatus, the keyword included in a print command by voice and the identification information linked to the keyword from a voice relay apparatus; a print data creating step of creating print data that uses the content that is associated with the acquired identification information and corresponds to the keyword acquired in the keyword acquiring step; a print data transmitting step of transmitting the created print data from the information processing apparatus to the printing apparatus; and a printing step of executing printing on the printing apparatus according to the transmitted print data.

An information processing apparatus in the present disclosure has an aspect in which the apparatus is coupled through a network to a printing apparatus that executes printing according to print data. The information processing apparatus has: a storage that stores registration information in correspondence with the identification information of a user, the registration information including at least one of a content corresponding to a keyword and acquired-from source information representing a source from which the content was acquired; a keyword acquiring section that acquires the keyword included in a print command by voice and the identification information linked to the keyword from a voice relay apparatus; and a transmitting section that creates print data that uses the content that is associated with the acquired identification information and corresponds to the keyword acquired by the keyword acquiring section, and transmits the print data to the printing apparatus.

A non-transitory computer-readable storage medium storing an information processing program in the present disclosure has an aspect in which the program is intended for an information processing apparatus that is coupled through a network to a printing apparatus that executes printing according to print data. The information processing apparatus has a storage that stores registration information in correspondence with the identification information of a user, the registration information including at least one of a content corresponding to a keyword and acquired-from source information representing a source from which the content was acquired. The information processing program causes a computer to implement: a keyword acquiring function that acquires the keyword included in a print command by voice and the identification information linked to the keyword from a voice relay apparatus; and a transmitting function that creates print data that uses the content that is associated with the acquired identification information and corresponds to the keyword acquired by the keyword acquiring function, and transmits the print data to the printing apparatus.

BRIEF DESCRIPTION OF THE DRAWINGS

FIG. 3 schematically illustrates an example of the structure of a registration table.

FIG. 8 schematically illustrates an example of a registration screen.

FIG. 11 schematically illustrates an example of the structure of management information.

FIG. 12 schematically illustrates an example of date-and-time identification keywords.

FIG. 13 schematically illustrates an example of the structure of a registration table.

DESCRIPTION OF EXEMPLARY EMBODIMENTS

Figure 1:
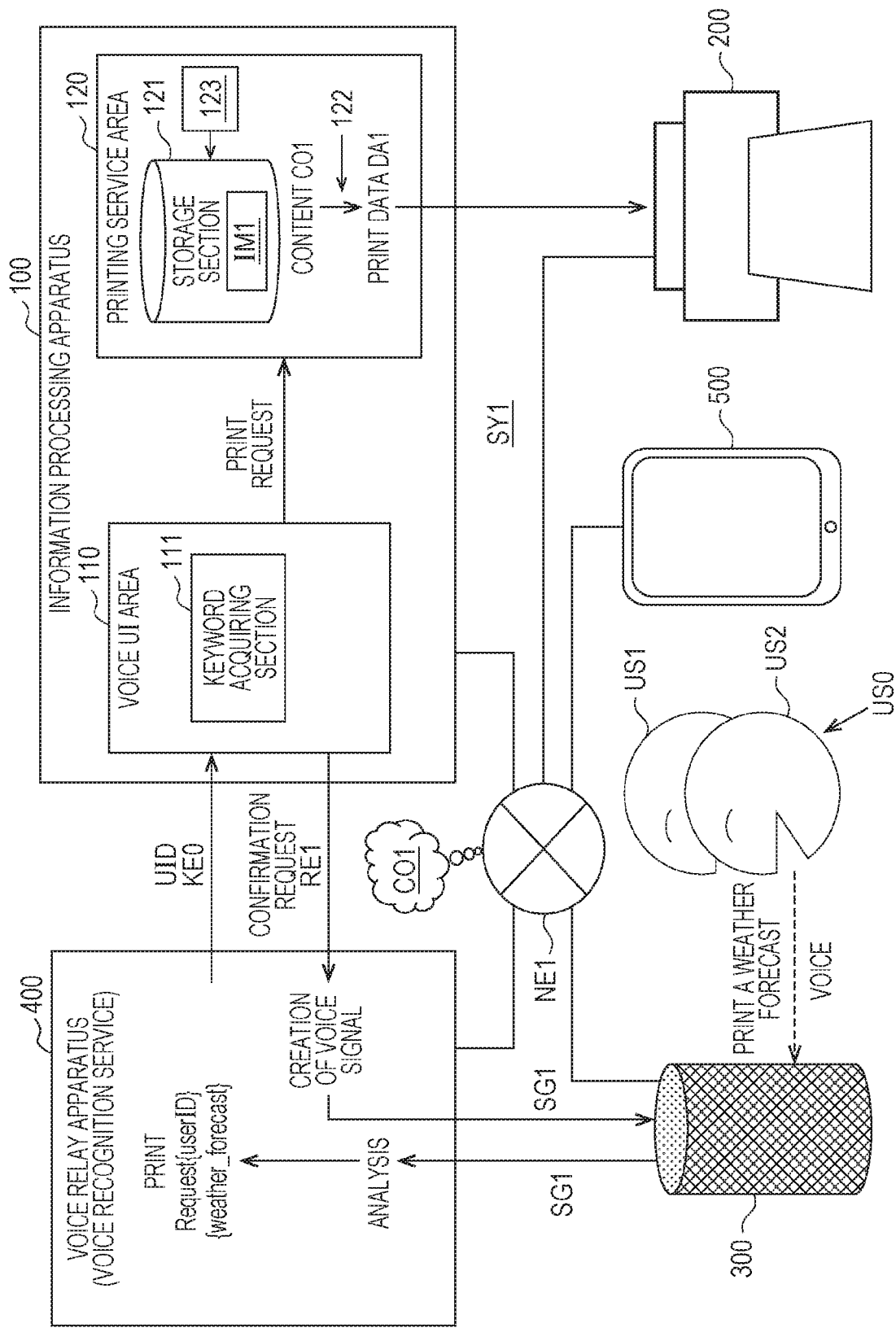
FIG. 1 is a block diagram schematically illustrating an example of the structure of a system that includes a printing system.

An embodiment of the present disclosure will be described below. Of course, the embodiment below just exemplifies the present disclosure. All of the features described in the embodiment are not always essential to the solution provided by the present disclosure.

1. Outline of the Technology Included in the Present Disclosure

The technology included in the present disclosure will be described first with reference to examples illustrated in FIGS. 1 to 14. The drawings in the present application just schematically illustrate examples. Magnification ratios indicated in these drawings in each direction may not be the same and the drawings may be inconsistent. Of course, each element in the present technology is not limited to a specific example indicted by a reference numeral. In "Outline of the technology included in the present disclosure", a numeral in parentheses is a supplement to the immediately preceding word or words.

First Aspect

A printing system SY1 according to an aspect of the present technology includes a printing apparatus (such as, for example, a printer 200) and an information processing apparatus 100 coupled to the printing apparatus (200) through a network NE1. The information processing apparatus 100 has a storage section 121, a keyword acquiring section 111, and a transmitting section 122. The storage section 121 stores registration information IM1 in correspondence with the identification information UID of a user US0, the registration information IM1 including at least one of a content CO1 corresponding to a keyword KE0 and acquired-from source information IM2 representing a source from which the content CO1 was acquired. The keyword acquiring section 111 acquires the keyword KE0 included in a print command by voice and the identification information UID linked to the keyword KE0 from a voice relay apparatus 400. The transmitting section 122 creates print data DA1 that uses the content CO1 that is associated with the acquired identification information UID and corresponds to the keyword KE0 acquired by the keyword acquiring section 111. The transmitting section 122 then transmits the print data DA1 to the printing apparatus (200). The printing apparatus (200) receives the print data DA1 and executes printing according to the print data DA1.

In the first aspect described above, print data DA1 is created that uses a content CO1 that is associated with the identification information UID of a user US0 and corresponds to a keyword KE0 included in a print command by voice. The print data DA1 is transmitted from an information processing apparatus 100 to a printing apparatus (200). When printing is executed by the printing apparatus (200) according to the transmitted print data DA1, printed matter of the content CO1 commanded by the voice of the user US0 is obtained. In this aspect, therefore, an appropriate content matching the user can be printed in response to a voice command. When a plurality of users use the printing system SY1, an appropriate content can be printed for each user in response to a voice command.

The information processing apparatus 100 may be a single computer or a plurality of computers that are mutually coupled.

A keyword only needs to be a word or words that can be simultaneously handled to identify a target record. Therefore, a keyword may be a phrase, clause, or the like without being limited to a single word.

The above additional description also applies to aspects below.

Second Aspect

Figure 2:
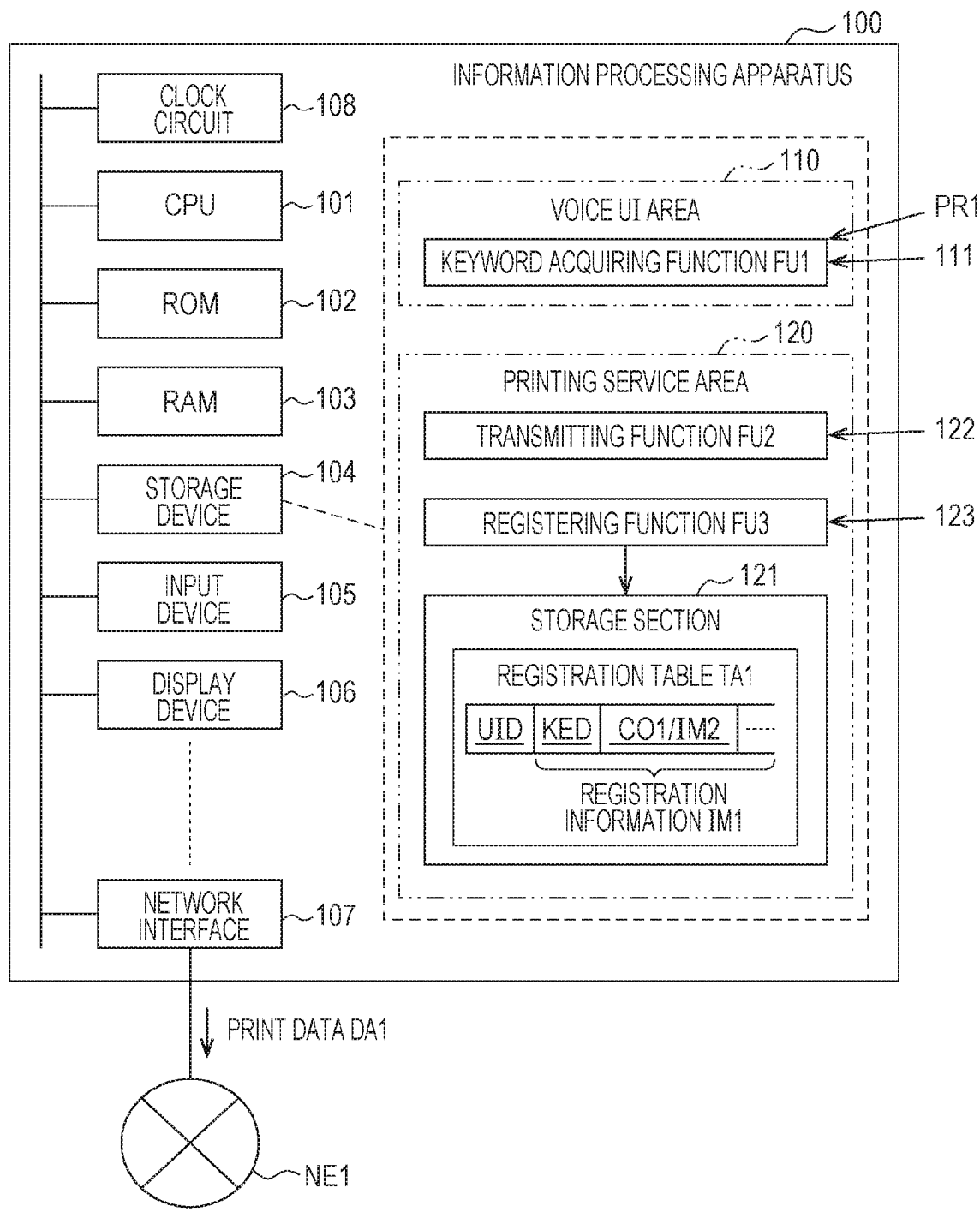
FIG. 2 is a block diagram schematically illustrating an example of the structure of an information processing apparatus.

The information processing apparatus 100 may further have a registering section 123 that stores the registration information IM1 in the storage section 121 as illustrated in FIGS. 1 and 2. The registering section 123 may acquire the registration information IM1 in response to a command received from the user US0 through the network NE1 and may acquire the identification information UID of the user US0. The registering section 123 may store the acquired registration information IM1 in the storage section 121 in correspondence with the acquired identification information UID. Thus, the user US0 can register in advance the content CO1 to be printed in response to a voice command. Therefore, this aspect can improve convenience.

Third Aspect

The printing system SY1 may further has a terminal 500 coupled to the network NE1 as illustrated in FIG. 1. The registering section 123 may cause the terminal 500 to execute processing to accept a manipulation to enter the registration information IM1, and may acquire the entered registration information IM1 from the terminal 500. Thus, the user US0 can use the terminal 500 to register the content CO1 to be printed in response to a voice command. Therefore, this aspect can further improve convenience.

Fourth Aspect

The registering section 123 may store, in the storage section 121, the registration information IM1 that includes a permission period T1 representing at least one of a day of the week on which the printing of the content CO1 is permitted and a time slot during which the printing of the content CO1 is permitted, as illustrated in FIG. 3. When the current date and time is within the permission period T1, the transmitting section 122 may create the print data DA1. When the current date and time is outside the permission period T1, the transmitting section 122 may not create the print data DA1. Thus, the user US0 can register at least one of a day of the week on which to print the content CO1 and a time slot during which to perform such printing. In this aspect, therefore, it is possible to suppress printing outside a permission period during which the printing of a content is not needed.

Fifth Aspect

The registering section 123 may store, in the storage section 121, the registration information IM1 that includes a print setting PS1 used to print the content CO1 as illustrated in FIG. 3 and other drawings. The transmitting section 122 may link the print setting PS1 associated with the identification information UID to the print data DA1, and may transmit the linked print setting PS1 to the printing apparatus (200). The printing apparatus (200) may receive the print setting PS1 and may execute printing according to the print data DA1 and print setting PS1. Thus, the user US0 can register the print setting PS1 of the content CO1. In this aspect, therefore, it is possible to print a content with a desired setting.

Sixth Aspect

Figure 14:
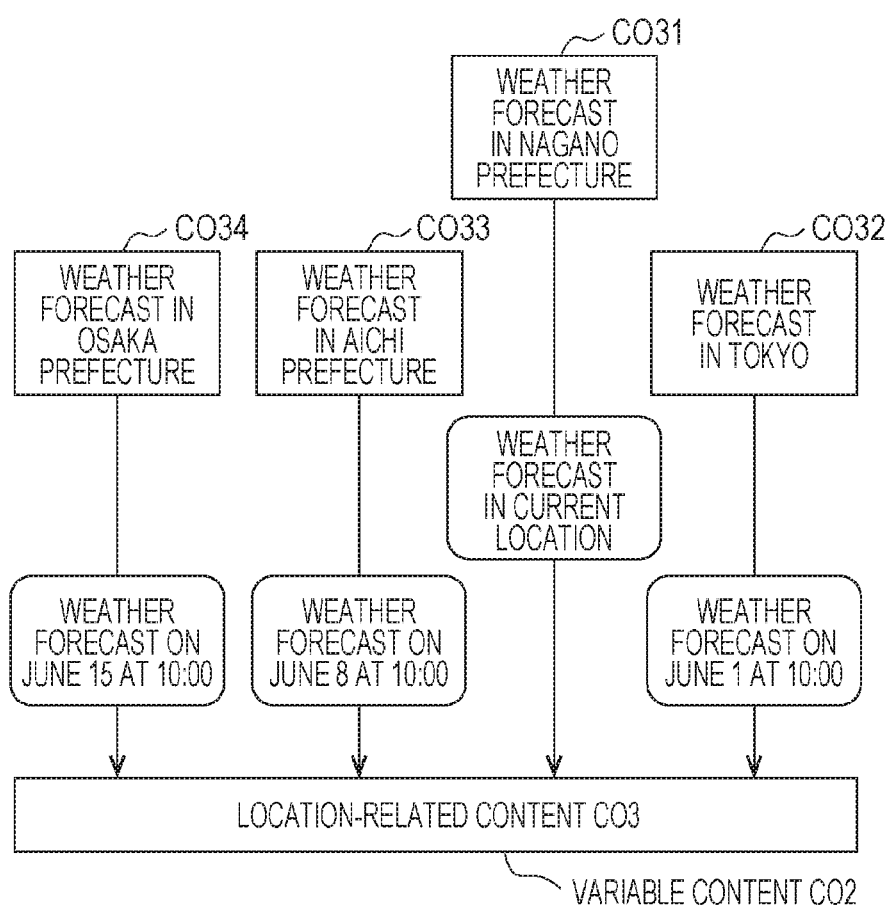
FIG. 14 schematically illustrates an example of the structure of a location-related content.

The content CO1 may include a variable content CO2 that can be varied depending on management information IM10 associated with the identification information UID, the management information IM10 being managed by an external application, as illustrated in FIGS. 11 and 14. The keyword KE0 may include a variable-content specifying keyword KE2 corresponding to the variable content CO2. The storage section 121 may store the registration information IM1 that includes the acquired-from source information IM2 representing a source from which the variable content CO2 corresponding to the variable-content specifying keyword KE2 was acquired, in correspondence with the identification information UID. When the keyword KE0 is the variable-content specifying keyword KE2, the transmitting section 122 may identify the variable content CO2 to be used in printing, according to the acquired-from source information IM2 associated with the identification information UID and to the management information IM10 associated with the identification information UID. The transmitting section 122 may create the print data DA1 that uses the identified variable content CO2. Thus, printed matter of the content CO1 matching the management information IM10 managed by an external application is obtained in response to a voice command from the user US0. Therefore, this aspect can improve convenience.

Seventh Aspect

The management information IM10 may include user location information IM11 representing the location of the user US0. The variable content CO2 may include a location-related content CO3 related to a location represented by the user location information IM11. The variable-content specifying keyword KE2 may include a location-related content specifying keyword KE3 corresponding to the location-related content CO3. When the keyword KE0 is the location-related content specifying keyword KE3, the transmitting section 122 may identify the location-related content CO3 to be used in printing, according to the acquired-from source information IM2 associated with the identification information UID and to the user location information IM11 associated with the identification information UID. The transmitting section 122 may create the print data DA1 that uses the identified location-related content CO3. Thus, printed matter of the content CO1 matching the user location information IM11 in the management information IM10 managed by an external application is obtained in response to a voice command from the user US0. Therefore, this aspect can improve convenience.

Eighth Aspect

The management information IM10 may include schedule table information IM12, in which the user location information IM11 representing a planned location of the user US0 is associated with a planned date and time. The location-related content CO3 may be at least one of a weather forecast in the planned location at the panned date and time, traffic information in the planned location at the planned date and time, and a map in the planned location. Thus, printed matter of at least one of a weather forecast, traffic information, and a map is obtained as the content CO1 matching the planned location, of the user US0, in the schedule table managed by an external application, in response to a voice command from the user US0. Therefore, this aspect can improve convenience.

Ninth Aspect

A printing method according to another aspect of the present technology uses a printing apparatus (200) and an information processing apparatus 100 coupled to the printing apparatus (200) through a network NE1. The printing method includes a storing step ST1, a keyword acquiring step ST2, a print data creating step ST3, a print data transmitting step ST4, and a printing step ST5. In the storing step ST1, registration information IM1 is stored in a storage section 121 in correspondence with the identification information UID of a user US0, the registration information IM1 including at least one of a content CO1 corresponding to a keyword KE0 and acquired-from source information IM2 representing a source from which the content CO1 was acquired. In the keyword acquiring step ST2, in the information processing apparatus 100, the keyword KE0 included in a print command by voice and the identification information UID linked to the keyword KE0 are acquired from a voice relay apparatus 400. In the print data creating step ST3, print data DA1 is created that uses the content CO1 that is associated with the acquired identification information UID and corresponds to the keyword KE0 acquired in the keyword acquiring step ST2. In the print data transmitting step ST4, the created print data DA1 is transmitted from the information processing apparatus 100 to the printing apparatus (200). In the printing step ST5, printing is executed on the printing apparatus (200) according to the transmitted print data DA1. In this aspect as well, therefore, an appropriate content matching the user can be printed in response to a voice command.

Tenth Aspect

An information processing apparatus 100 according to yet another aspect of the present technology is coupled through a network NE1 to a printing apparatus (200) that executes printing according to print data DA1. The information processing apparatus 100 has a storage section 121, a keyword acquiring section 111, and a transmitting section 122. The storage section 121 stores registration information IM1 in correspondence with the identification information UID of a user US0, the registration information IM1 including at least one of a content CO1 corresponding to a keyword KE0 and acquired-from source information IM2 representing a source from which the content CO1 was acquired. The keyword acquiring section 111 acquires the keyword KE0 included in a print command by voice and the identification information UID linked to the keyword KE0 from a voice relay apparatus 400. The transmitting section 122 creates print data DA1 that uses the content CO1 that is associated with the acquired identification information UID and corresponds to the keyword KE0 acquired by the keyword acquiring section 111. The transmitting section 122 then transmits the print data DA1 to the printing apparatus (200). When printing is executed by the printing apparatus (200) according to the transmitted print data DA1, printed matter of the content CO1 commanded by the voice of the user US0 is obtained. In this aspect as well, therefore, an appropriate content matching the user can be printed in response to a voice command.

Eleventh Aspect

A non-transitory computer-readable storage medium stores an information processing program PR1 according to still another aspect of the present technology, the information processing program PR1 being intended for an information processing apparatus 100 coupled through a network NE1 to a printing apparatus (200) that executes printing according to print data DA1. The information processing program PR1 causes a computer (such as, for example, the information processing apparatus 100) to implement a keyword acquiring function FU1 and a transmitting function FU2. The information processing apparatus 100 has a storage section 121 that stores registration information IM1 that includes at least one of a content CO1 corresponding to a keyword KE0 and acquired-from source information IM2 representing a source from which the content CO1 was acquired, in correspondence with the identification information UID of a user US0. The keyword acquiring function FU1 acquires the keyword KE0 included in a print command by voice and the identification information UID linked to the keyword KE0 from a voice relay apparatus 400. The transmitting function FU2 creates the print data DA1 that uses the content CO1 that is associated with the acquired identification information UID and corresponds to the keyword KE0 acquired by the keyword acquiring function FU1. The transmitting function FU2 then transmits the print data DA1 to the printing apparatus (200). When printing is performed by the printing apparatus (200) according to the transmitted print data DA1, printed matter of the content CO1 commanded by the voice of the user US0 is obtained. In this aspect as well, therefore, an appropriate content matching the user can be printed in response to a voice command.

The information processing program PR1 may further cause the computer to implement a registering function FU3 that stores the registration information IM1 in the storage section 121.

The present technology can be applied to a complex system that includes the printing system SY1 described above, a complex apparatus that includes the information processing apparatus 100 described above, an information processing method practiced by the information processing apparatus 100 described above, a computer-readable storage medium storing the information processing program PR1 described above, and the like. Any of the apparatuses described above may be composed of a plurality of distributed portions.

2 Background Under which the Present Technology was Devised

Smart speakers that work in cooperation with a voice recognition service on a cloud are commercially available in recent years. Under the assumption that a smart speaker is used to command printing by voice, it is thought that fixed print contents held by a cloud print service are printed in succession because in printing by voice, printed matter is difficult to specify. Since a different content is printed in each printing, however, the user does not know what content is to be printed when the user commands printing.

To meet the demand of the user who issues a print command to a recent smart speaker, a scheme is needed to specify printed matter in such a way that printing is more surely performed for each user in response to a voice command. The present technology enables an appropriate content to be printed for each user in response to a voice command.

Specific examples in the present technology will be described below.

3 Specific Example of the Structure of the Printing System

FIG. 1 schematically illustrates an example of the structure of a system that includes a printing system SY1. The system in FIG. 1 includes an information processing apparatus 100, a printer 200, a smart speaker 300, a voice relay apparatus 400, and a terminal 500. The printing system SY1 includes the information processing apparatus 100, printer 200, and terminal 500. The information processing apparatus 100, printer 200, smart speaker 300, voice relay apparatus 400, and terminal 500 are coupled to a network NE1 that includes the Internet. The network NE1 that includes the Internet may include a local area network (LAN). Coupling to the network NE1 may be wired coupling, wireless coupling, or a combination of wired coupling and wireless coupling. The information processing apparatus 100 is a server computer that provides a function called a cloud printing service. The information processing apparatus 100 opens a function called a voice user interface (UI) to the voice relay apparatus 400. The information processing apparatus 100 receives a keyword KE0 from the voice relay apparatus 400 and transmits print data DA1 based on the keyword KE0 to the printer 200. The printer 200 is a printing apparatus that receives the print data DA1 from the information processing apparatus 100 and forms a printed image according to the print data DA1. The smart speaker 300 is a voice input/output device that uses a function called a voice recognition service provided by the voice relay apparatus 400. The voice relay apparatus 400 is a server computer that uses artificial intelligence (AI) to implement the voice recognition service.

In the description below, the voice UI will refer to a function, called the voice UI, that is exerted as part of the functions of the information processing apparatus 100, and the cloud printing service will refer to a function, called the cloud printing service, that is exerted as part of the functions of the information processing apparatus 100.

The information processing apparatus 100 has a voice UI area 110, which is a storage area in which information to implement the voice UI is stored, and also has a printing service area 120, which is a storage area in which information to implement the cloud printing service is stored. The voice UI is a service implemented by the provider of the cloud printing service on a platform for the voice recognition service. The voice UI area 110 includes an information area in which the identification information UID of a user US0 and a keyword acquiring section 111 that acquires the keyword KE0 are implanted. The user US0 in FIG. 1 is a generic name for users US1 and US2. The printing service area 120 includes a storage section 121 in which registration information IM1 is stored, a transmitting section 122, and an information area in which a registering section 123 is implemented. Of course, the voice UI and cloud printing service may be implemented in different computers. Alternatively, the voice UI may be implemented in the server computer that provides the voice recognition service.

When, for example, the user US2 pronounces "Print a weather forecast", the smart speaker 300 converts the voice from the user US2 to a voice signal SG1 and transmits the voice signal SG1 to the voice relay apparatus 400 through the network NE1. The voice relay apparatus 400 receives the voice signal SG1 and analyzes the voice according to the voice signal SG1 to identify the user US2. When the voice includes a request keyword "print", the voice relay apparatus 400 requests the voice UI for printing and passes the identification information UID of the user US2 and the keyword KE0, such as "weather forecast", included in the voice to the voice UI. "Print Request{userID} {weather_forecast}" in FIG. 1 is an example of a request that includes the identification information UID and keyword KE0. In this example, {userID} indicates identification information of the user and {weather_forecast} indicates a keyword such as "weather forecast". Upon receipt of the identification information UID and keyword KE0, the voice UI outputs, to the cloud printing service, a print request for a content CO1 identified by the identification information UID and keyword KE0. The cloud printing service receives the print request and identifies the content CO1 to be printed from at least the identification information UID and keyword KE0, after which the cloud printing service creates print data DA1 that uses this content CO1, and transmits the print data DA1 to the printer 200 through the network NE1. The printer 200 receives the print data DA1 and executes printing according to the print data DA1. Thus, the content CO1 about "weather forecast" pronounced by the user US2 is printed. Besides specifying only a target to be printed with the keyword KE0, the user US2 may also specify the printer 200 that the user US2 assumes as the output destination by pronouncing "Print a weather forecast with a printer from company A", for example.

Of course, when another user US1 pronounces "Print accustomed news", the content CO1 about "accustomed news" pronounced by the user US1 is printed. When a plurality of users US0 uses the printing system SY1, an appropriate content is printed for each user in response to a voice command.

The request keyword for printing is not limited to "print". Various variations, such as "Perform printing of", similar to "print" are possible. In view of this, processing for a voice that includes any of these variations may be performed as in processing for a voice that includes the request keyword "print".

The voice UI may output, to the voice relay apparatus 400, a request such as a confirmation request RE1 with a setting name corresponding to the content CO1. Upon receipt of the confirmation request RE1, the voice relay apparatus 400 converts the setting name to a digital voice signal SG1 and transmits the voice signal SG1 to the smart speaker 300 through the network NE1. The smart speaker 300 receives the voice signal SG1, converts the voice signal SG1 to a voice, and outputs the voice. Thus, the setting name corresponding to the content CO1 is read aloud by a voice.

FIG. 2 schematically illustrates the structure of the information processing apparatus 100. The information processing apparatus 100 in FIG. 2 is a single server computer having the voice UI area 110 and printing service area 120. However, the information processing apparatus 100 may be composed of a plurality of server computers that are mutually coupled. For example, the information processing apparatus 100 may have a structure in which a server computer having the voice UI area 110 and a server computer having the printing service area 120 are separately provided. Alternatively, the voice UI area 110 may be allocated in a server computer that provides the voice recognition service. In these cases as well, the information processing apparatus 100 that includes the voice UI area 110 and printing service area 120 is implemented.

The information processing apparatus 100 in FIG. 2 has a central processing unit (CPU) 101, which is a processor, a read-only memory (ROM) 102, which is a semiconductor memory, a random-access memory (RAM) 103, which is also a semiconductor memory, a storage device 104, an input device 105, a display device 106, a network interface 107, a clock circuit 108, and the like. Since these components denoted by the reference numerals 101 to 108 and other components are electrically coupled together, information can be input and output among them.

The storage device 104 stores an operating system (OS) (not illustrated). The storage device 104 also includes the voice UI area 110 and printing service area 120 described above. The voice UI area 110 stores a program and the like, the program causing the information processing apparatus 100 to implement a keyword acquiring function FU1. The printing service area 120 includes the storage section 121 that stores a registration table TA1. The printing service area 120 also stores a program and the like, the program causing the information processing apparatus 100 to implement a transmitting function FU2 and a registering function FU3. An information processing program PR1 includes programs that cause the information processing apparatus 100 to implement the functions FU1 to FU3 described above. The registration table TA1 stored in the storage section 121 stores registration information IM1 that includes at least one of the content CO1 corresponding to the keyword KE0 and acquired-from source information IM2 representing a source from which the content CO1 was acquired, in correspondence with the identification information UID of the user US0. Information stored in the storage device 104 is appropriately read into the RAM 103 and is used in processing to cause the printer 200 to execute printing. A magnetic storage device such as a hard disk drive, a non-volatile semiconductor memory such as a flash memory, or the like can be used as the storage device 104.

A pointing device, hardware keys including a keyboard, a touch panel attached to the front surface of a display panel, or the like can be used as the input device 105. A liquid display panel or the like can be used as the display device 106. The network interface 107, coupled to the network NE1, communicates with a distant device coupled to the network NE1 according to a predetermined communication protocol. The clock circuit 108 can output the current date and time.

Figure 7:
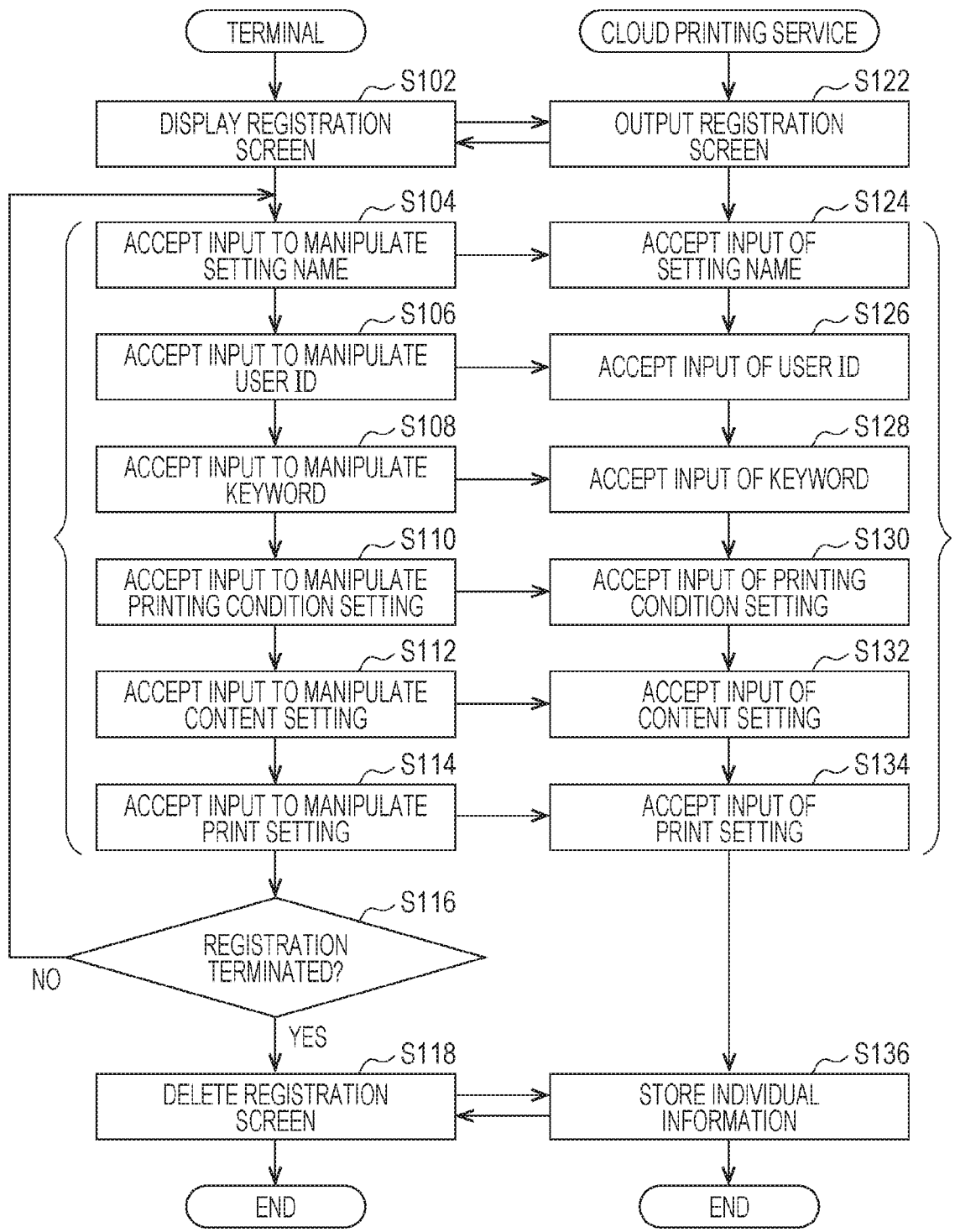
FIG. 7 is a flowchart schematically illustrating an example of registration processing.

The CPU 101 executes the information processing program PR1 read from the storage device 104 into the RAM 103 to perform keyword acquisition processing corresponding to the keyword acquiring function FU1, transmission processing corresponding to the transmitting function FU2, and registration processing corresponding to the registering function FU3. The information processing program PR1 causes the information processing apparatus 100, which is a computer, to function as the keyword acquiring section 111 corresponding to the keyword acquiring function FU1, the transmitting section 122 corresponding to the transmitting function FU2, and the registering section 123 corresponding to the registering function FU3. The information processing apparatus 100, which executes the information processing program PR1, executes a storing step ST1, a keyword acquiring step ST2, a print data creating step ST3, and a print data transmitting step ST4 as illustrated in FIGS. 7 and 8. A computer-readable medium storing the information processing program PR1 may be a recording medium outside the information processing apparatus 100 without being limited to the storage device 104.

FIG. 3 schematically illustrates the structure of the registration table TA1 stored in the storage section 121. The registration table TA1 includes a plurality of pieces of individual information IM0, in each of which a setting name, the identification information UID of the user US0, the keyword KE0, a printing condition, the content CO1 or its acquired-from source information IM2, and the print setting PS1 are mutually associated. The printing condition, the content CO1 or its acquired-from source information IM2, and the print setting PS1 are an example of registration information IM1. Individual information IM0 is set, for example, by a manipulation of the user US0 who uses the terminal 500.

The setting name is associated with the content CO1 by the user US0. The keyword KE0 corresponds to the content CO1 to be printed. The printing condition refers to a permission period T1 representing at least one of a day of the week on which the printing of the content CO1 is permitted and a time slot during which the printing of the content CO1 is permitted. For example, the printing condition "6:00 to 9:00 every day" refers to that the permission period T1 for printing is from 6 o'clock to 9 o'clock every day. The printing condition "every Sunday" refers to that the permission period T1 for printing is every Sunday. The printing condition "from 6:00 on Saturday to 9:00 on Sunday every week" refers to that the permission period T1 for printing is from 6 o'clock on Saturday to 9 o'clock on Sunday every week. Acquired-from source information IM2 represents a source from which the content CO1 was acquired. Instead of acquired-from source information IM2, the content CO1 may be stored directly in the individual information IM0. Alternatively, the content CO1 may be stored together with acquired-from source information IM2. The print setting PS1 refers to settings used to print the content C1 such as a sheet size, the number of copies to be printed, an indication as to whether printing is monochrome printing or color printing, and assignment of images to be printed on the sheet.

Figure 4:
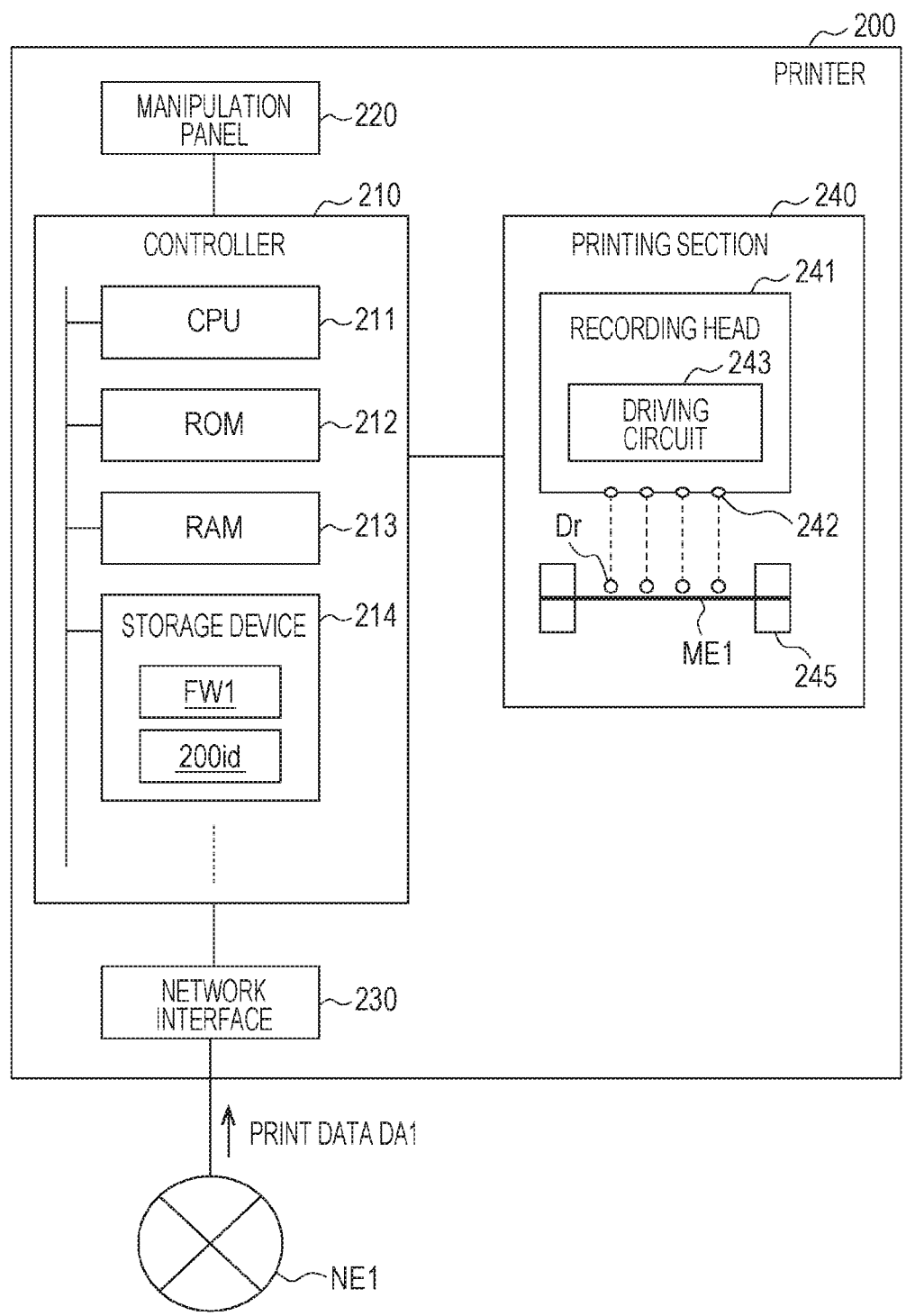
FIG. 4 is a block diagram schematically illustrating an example of the structure of a printing apparatus.

FIG. 4 schematically illustrates an example of the structure of the printer 200. The printer 200 in FIG. 4 is a printing apparatus that can execute printing according to print data DA1 received through the network NE1. The printer 200 usable in the printing system SY1 is not limited to an ink jet printer, an electrophotographic printer such as a laser printer, and the like. Of course, the printer 200 may be a copier, a facsimile machine, a multi-function peripheral having functions of a copier and a facsimile machine, or the like. The printer 200 in FIG. 4 is an ink jet printer.

The printer 200 in FIG. 4 has a controller 210, a manipulation panel 220, a network interface 230, and a printing section 240.

The controller 210 has a CPU 211, a ROM 212, a RAM 213, a storage device 214, and the like. Since these components denoted by the reference numerals 211 to 214 and other components are electrically coupled together, information can be input and output among them. That is, the printer 200 is also one type of computer. The storage device 214 stores firmware FW1 that causes a computer to function as the printer 200, printer identification information 200*id* used to identify the printer 200 individually, and the like. A mail address, an Internet protocol (IP) address, a serial number, or the like can be used as printer identification information 200*id*. Examples usable as the storage device 214 include a non-volatile semiconductor memory such as a flash memory, a magnetic storage device such as a hard disk drive, and the like.

The manipulation panel 220 has a display section, a manipulation input section, and the like. The manipulation panel 220 accepts a manipulation by the user. The display section, which is, for example, a liquid crystal panel, displays information indicating the state of the printer 200, information indicating a command from the user, and the like. The manipulation input section is composed of, for example, a plurality of keys including a cursor key and an enter key. The manipulation input section may be, for example, a touch panel that accepts a manipulation to a display screen.

The network interface 230, which is coupled to the network NE1, communicates with a distant apparatus coupled to the network NE1 according to a prescribed communication protocol.

The printing section 240 has a recording head 241 that discharge liquid droplets Dr, such as ink droplets, to a print substrate ME1, and also has a paper feed section 245 that transports the print substrate ME1. The recording head 241 has a plurality of nozzles 242, from each of which liquid droplets Dr are discharged, and also has a driving circuit 243 that causes liquid droplets Dr to be ejected from the nozzles 242. An example usable as the driving circuit 243 is a circuit that drives piezoelectric elements, each of which pressurizes the liquid in a pressure chamber communicating with the relevant nozzle 242. Another example is a circuit that drives thermal elements, each of which generates a bubble in the liquid in the relevant pressure chamber. When liquid droplets Dr land on the print substrate ME1 transported by the paper feed section 245, a printed image is formed on the print substrate ME1 according to print data print data DA1 from the information processing apparatus 100.

The print substrate ME1 is a raw material that holds a printed image. Examples usable as the print substrate ME1 include paper, a resin, a metal, and the like. Generally, the print substrate ME1 is rectangular or in the form of a roll. However, the print substrate ME1 may have a substantially circular shape such as that of an optical disc, a polygonal shape other than a rectangular shape, or a stereoscopic shape.

Figure 5:
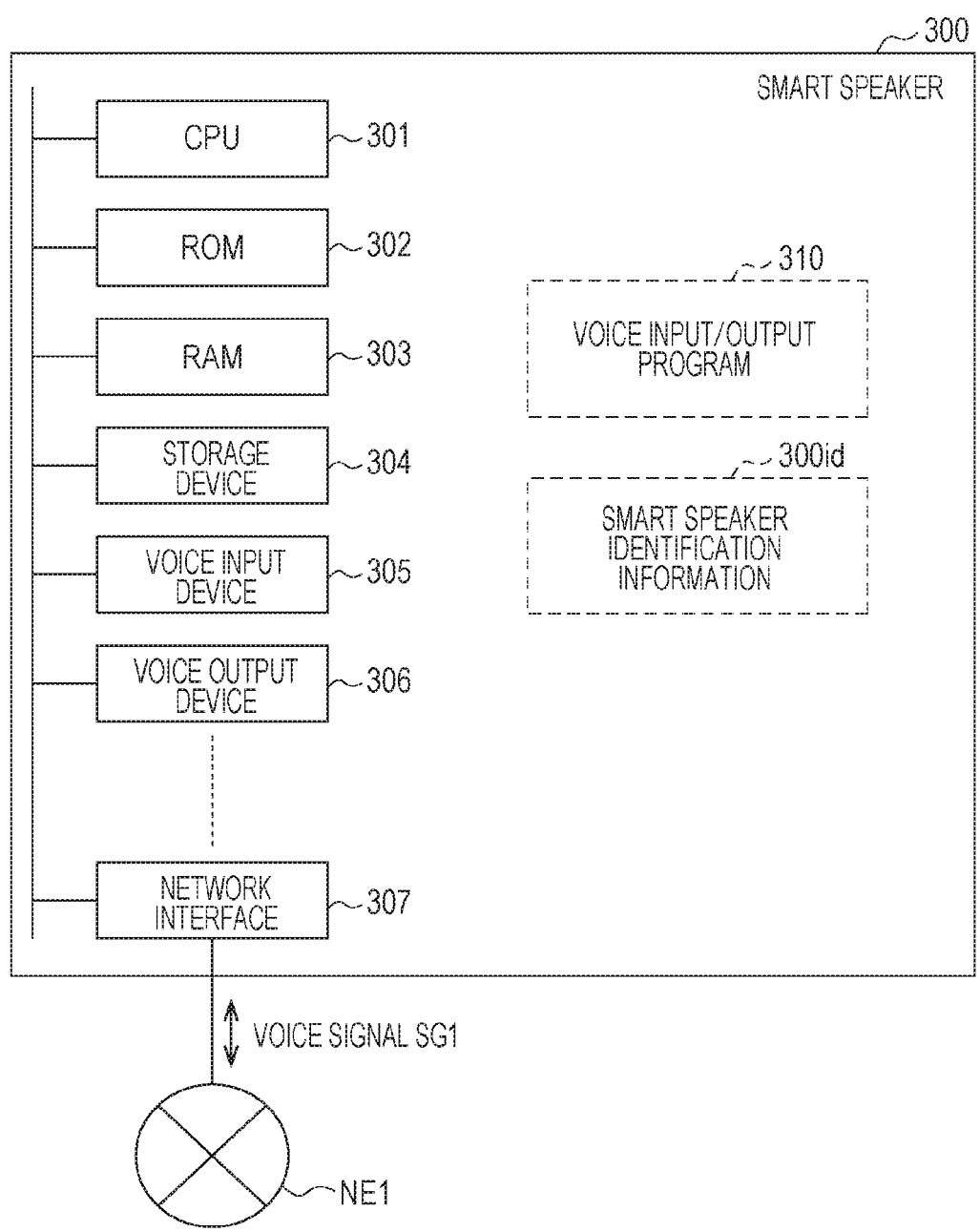
FIG. 5 is a block diagram schematically illustrating an example of the structure of a voice input/output device.

FIG. 5 schematically illustrates the structure of the smart speaker 300 that uses the voice recognition service provided by the voice relay apparatus 400. The smart speaker 300 in FIG. 5 has a CPU 301, a ROM 302, a RAM 303, a storage device 304, a voice input device 305, a voice output device 306, a network interface 307, and the like. Since these components denoted by the reference numerals 301 to 307 and other components are electrically coupled together, information can be input and output among them. That is, the smart speaker 300 is also one type of computer. The storage device 304 stores a voice input/output program 310 that causes a computer to function as the smart speaker 300, smart speaker identification information 300id used to identify the smart speaker 300 individually, and the like. Examples usable as the storage device 304 include a non-volatile semiconductor memory such as a flash memory, a magnetic storage device such as a hard disk drive, and the like.

The voice input device 305, which has a microphone, receives a voice from the outside, converts the voice to an analog electric signal with the microphone, and converts the electric signal to a digital voice signal SG1. A single voice input device 305 may be attached to the smart speaker 300. Alternatively, at least two voice input devices 305 may be attached to the smart speaker 300. The voice output device 306 has a speaker, in a narrow sense, that converts an electric signal to a sound. The voice output device 306 converts the voice signal SG1 to an analog electric signal, converts the electric signal to a voice with the speaker, and outputs the voice to the outside. A single voice output device 306 may be attached to the smart speaker 300. Alternatively, at least two voice output devices 306 may be attached to the smart speaker 300. The network interface 307, which is coupled to the network NE1, communicates with a distant apparatus coupled to the network NE1 according to a prescribed communication protocol.

The voice relay apparatus 400, which is a server computer, has a CPU, a ROM, a RAM, a storage device, an input device, a display device, a network interface, and the like, for example.

Figure 6:
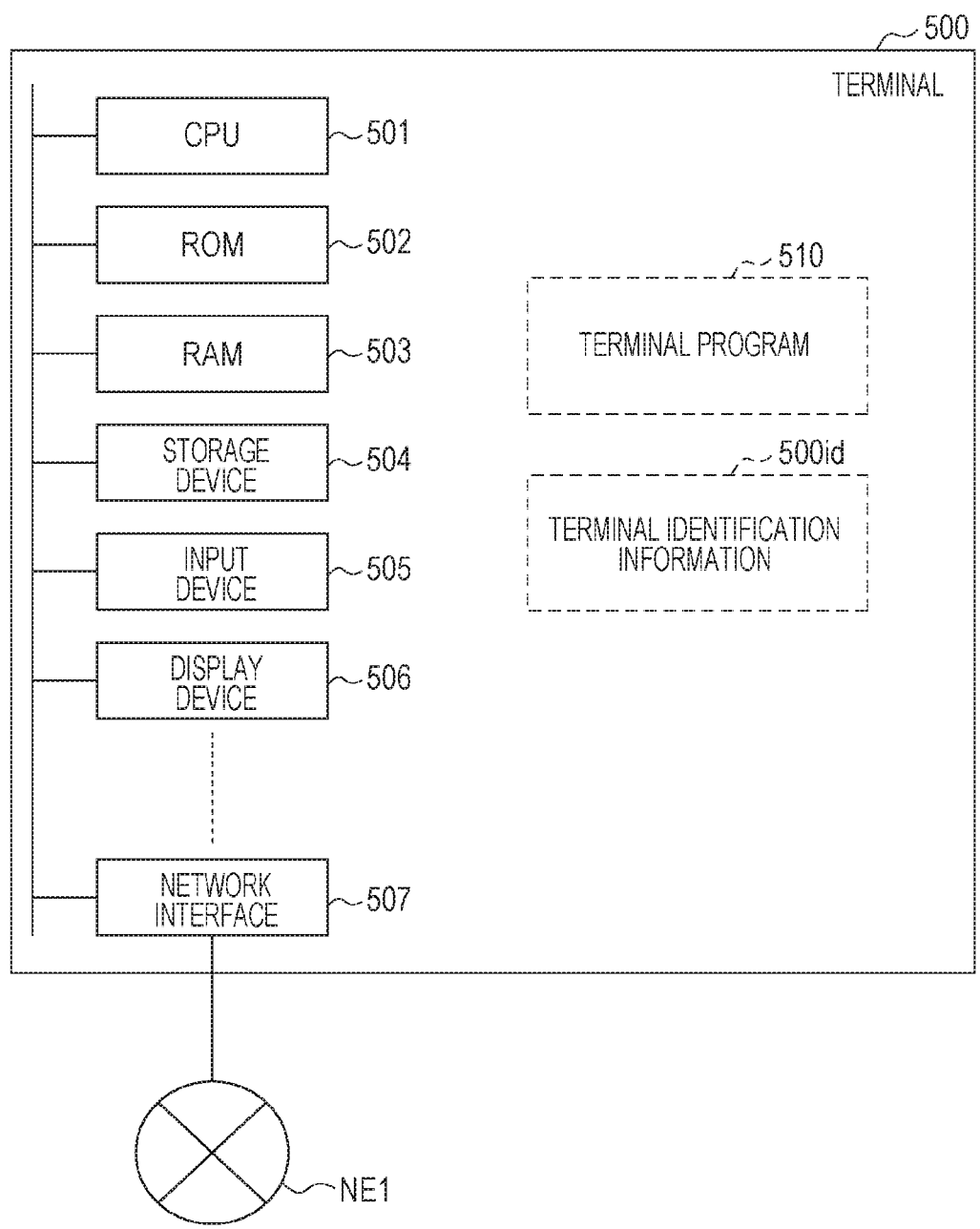
FIG. 6 is a block diagram schematically illustrating an example of the structure of a terminal.

FIG. 6 schematically illustrates the structure of the terminal 500 used by the user US0. The terminal 500 in FIG. 6 has a CPU 501, a ROM 502, a RAM 503, a storage device 504, an input device 505, a display device 506, a network interface 507, and the like. Since these components denoted by the reference numerals 501 to 507 and other components are electrically coupled together, information can be input and output among them. The storage device 504 stores a terminal program 510 that causes a computer to function as the terminal 500, terminal identification information 500id used to identify the terminal 500 individually, and the like. Examples usable as the storage device 504 include a non-volatile semiconductor memory such as a flash memory, a magnetic storage device such as a hard disk drive, and the like.

Examples usable as the input device 505 include a touch panel attached to the front surface of the display panel, a pointing device, hardware keys including a keyboard, and the like. Examples usable as the display device 506 include a display panel such as a liquid crystal panel and the like. The network interface 507, which is coupled to the network NE1, communicates with a distant apparatus coupled to the network NE1 according to a prescribed communication protocol.

Examples usable as the terminal 500 include a personal computer, a mobile terminal such as a smartphone or tablet terminal, and the like.

4 Specific Example of Processing by the System

FIG. 7 schematically illustrates processing to register individual information IM0 in the printing system SY1. As described above, the cloud printing service is a function exerted as part of the functions of the information processing apparatus 100. The terminal 500 and cloud printing service mutually communicate through the network NE1. Registration processing in FIG. 7, which corresponds to the registering section 123, storing step ST1, and registering function FU3, includes processing performed in the terminal 500 in steps S102 to S118 and processing performed by the cloud printing service in steps S122 and S136. In the description below, each step is represented by a parenthesized step number with the term "step" omitted.

When the terminal 500 requests a registration screen on which to register individual information IM0 in response to a manipulation by the user US0 (S102), the cloud printing service transmits the registration screen to the terminal 500 (S122) and the terminal 500 displays the registration screen (S102). FIG. 8 illustrates an example of the registration screen displayed on the terminal 500. The registration screen 600 in FIG. 8 includes input fields 601 to 606 and an end button 607. In the description below, FIG. 3 will also be referenced.

After the registration screen 600 has been displayed, the terminal 500 accepts, in the setting name input field 601, an input to manipulate a setting name from the user US0, after which the terminal 500 transmits the accepted setting name to the cloud printing service (S104). The cloud printing service accepts an input of the setting name from the terminal 500 and stores the accepted setting name in "Setting name" in individual information IM0 in FIG. 3 (S124).

The terminal 500 accepts an input to manipulate identification information UID from the user US0 in a user ID input field 602, and transmits the accepted identification information UID to the cloud printing service (S106). When the storage device 504 in the terminal 500 stores the identification information UID, the terminal 500 may read the identification information UID from the storage device 504 and may display the identification information UID in the user ID input field 602. The cloud printing service accepts an input of the identification information UID from the terminal 500 and stores the accepted identification information UID in "User ID" in individual information IM0 in FIG. 3 (S126).

The terminal 500 accepts an input to manipulate a keyword from the user US0 in a keyword input field 603, and transmits the accepted keyword to the cloud printing service (S108). The cloud printing service accepts an input of the keyword from the terminal 500, and stores the accepted keyword in "Keyword" in individual information IM0 in FIG. 3 (S128).

The terminal 500 accepts an input to manipulate a permission period T1 from the user US0 in a printing condition input field 604 as a printing condition, and transmits the accepted permission period T1 to the cloud printing service (S110). The cloud printing service accepts an input of the permission period T1 from the terminal 500, and stores the accepted permission period T1 in "Printing condition" in individual information IM0 in FIG. 3 (S130).

The terminal 500 accepts an input to specify the address of the content CO1 from the user US0 in a content input field 605, and transmits the accepted address to the cloud printing service (S112). The accepted address is an example of acquired-from source information IM2. The cloud printing service accepts an input of the address of the content CO1 from the terminal 500, and stores the accepted address in "Content" in individual information IM0 in FIG. 3 (S132). The terminal 500 can also accept an input to specify the content CO1 to be uploaded. In this case, the terminal 500 transmits the accepted content CO1 to the cloud printing service (S122). The cloud printing service receives the content CO1 from the terminal 500, and stores the storage position of the received content CO1 in "Content" in individual information IM0 in FIG. 3 (S132). The cloud printing service may also store the content CO1 itself in "Content" in individual information IM0 as illustrated in individual information IM0 at the bottom in FIG. 3.

The terminal 500 accepts an input to manipulate a print setting PS1 from the user US0 in a print setting field 606, and transmits the accepted print setting PS1 to the cloud printing service (S114). The cloud printing service accepts an input of the print setting PS1 from the terminal 500, and stores the accepted print setting PS1 in "Print setting" in individual information IM0 in FIG. 3 (S134).

The terminal 500 repeats processing in S104 to S114 described above regardless of the sequence of these steps until the end button 607 is manipulated (S116).

When the end button 607 is manipulated, the terminal 500 transmits a registration termination request to the cloud printing service, and deletes the registration screen 600 (S118). Upon receipt of the registration termination request, the cloud printing service places the individual information IM0 having information entered into the input fields 601 to 606 in the registration table TA1, and stores the updated registration table TA1 in the storage section 121 (S136).

As described above, the cloud printing service acquires the identification information UID of the user US0 and registration information IM1 by accepting inputs from the user US0 through the network NE1, and stores the acquired registration information IM1 in the storage section 121 in correspondence with the acquired identification information UID. Thus, registration information IM1 that includes at least one of the content CO1 corresponding to the keyword KE0 and the acquired-from source information IM2 representing a source from which the content CO1 was acquired is stored in the storage section 121 in correspondence with the identification information UID of the user US0.

The cloud printing service may cooperate with the smart speaker 300 through the voice UI and voice relay apparatus 400 to perform processing to register individual information IM0. When, for example, accepting a voice input of information in individual information IM0 from the smart speaker 300, the cloud printing service may acquire, from a voice meaning a character, the character to accept the information in the individual information IM0.

Figure 9:
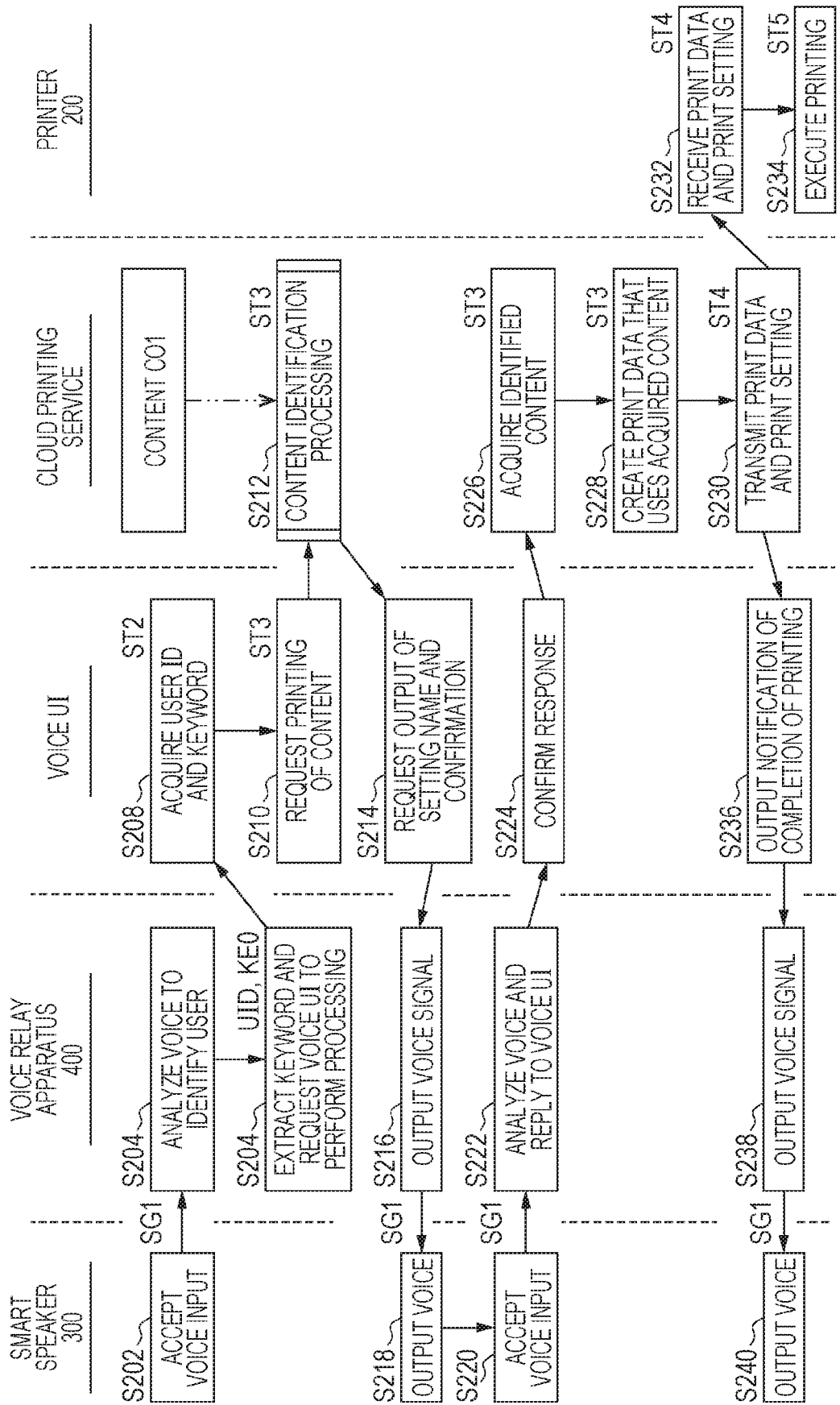
FIG. 9 schematically illustrates processing performed before printing is performed in response to a voice input.

FIG. 9 schematically illustrates processing up to printing performed in the system that includes the printing system SY1 in response to a voice input. As described above, the voice UI is a function, called the voice UI, that is exerted as part of the functions of the information processing apparatus 100, and the cloud printing service is a function, called the cloud printing service, that is exerted as part of the functions of the information processing apparatus 100. Processing in S208 and subsequent steps is performed when a voice that includes the request keyword "Print" or the like is entered into the smart speaker 300. S208 corresponds to the keyword acquiring step ST2, keyword acquiring section 111, and keyword acquiring function FU1. S210 to S212 and S226 to S228 correspond to the print data creating step ST3. S230 to S232 correspond to the print data transmitting step ST4. S210 to S212 and S226 to S230 correspond to the transmitting section 122 and transmitting function FU2. S234 corresponds to the printing step ST5.

When the user US0 speaks to the smart speaker 300 about printing, the smart speaker 300 converts a voice from the user US0 to a voice signal SG1 and transmits the voice signal SG1 to the voice relay apparatus 400 through the network NE1 (S202). The voice relay apparatus 400 receives the voice signal SG1, analyzes the voice according to the voice signal SG1 to identify the user US0, and acquire identification information UID corresponding to the identified user US0 (S204). The voice relay apparatus 400 also extracts the keyword KE0 other than the request keyword, and passes the keyword KE0 and the identification information UID linked to the keyword KE0 to the voice UI to request the voice UI to perform processing (S206). The keyword KE0 is included in a print command by voice.

The voice relay apparatus 400 stores identification information UID in a storage device for each user, and also stores information representing a feature of a voice in the storage device for each user in correspondence with identification information UID. A feature of a voice used to identify a user can be represented, for example, by the frequency distribution of the voice. Therefore, the voice relay apparatus 400 can obtain the frequency distribution of the voice according to the voice signal SG1, can acquire identification information UID associated with the frequency distribution closest to the obtained frequency distribution from the storage device, and can pass the acquired identification information UID to the voice UI. Alternatively, the smart speaker 300 may accept a voice input of the name of the user US0, after which the voice relay apparatus 400 may extract the name of the user US0 according to the voice signal SG1 to acquire identification information UID associated with the name from the storage device and may pass the identification information UID to the voice UI.

The voice UI acquires, from the voice relay apparatus 400, the keyword KE0 included in the voice command and identification information UID linked to the keyword KE0 (S208). The voice UI then outputs a content print request that includes the acquired keyword KE0 and acquired identification information UID to the cloud printing service (S210). The cloud printing service accepts the content print request, and performs processing to identify the content CO1 to be printed from the acquired keyword KE0 and acquired identification information UID (S212).

Figure 10:
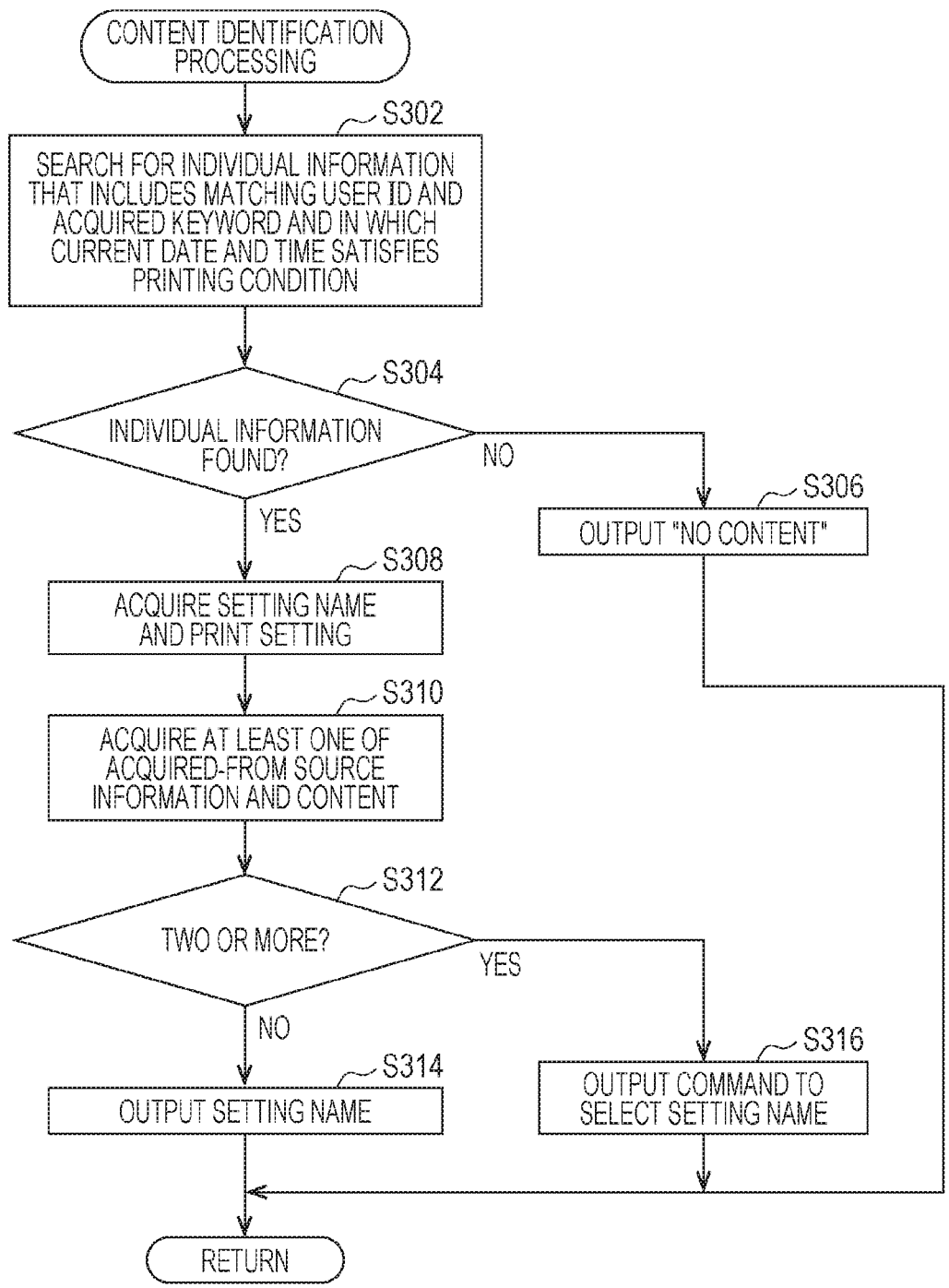
FIG. 10 is a flowchart schematically illustrating an example of content identification processing.

FIG. 10 schematically illustrates content identification processing performed in S212 in FIG. 9. When content identification processing is started, the cloud printing service searches the registration table TA1 in FIG. 3 for individual information IM0 that includes a matching user ID and the acquired keyword KE0 and in which the current date and time satisfies the printing condition (S302). The content CO1 indicated in the individual information IM0 to be searched for is associated with the acquired identification information UID and corresponds to the acquired keyword KE0.

For example, suppose that the user US2 pronounces "Print a weather forecast" at seven o'clock in the morning on Monday as illustrated in FIG. 1. Of a plurality of pieces of individual information IM0, only individual information that includes the setting name "today's weather" satisfies the condition that the user ID is UID2, the keyword includes "weather forecast", and the current date and time satisfies the printing condition. Therefore, this individual information is searched for. Also suppose that the user US2 pronounces "Print a weather forecast" at nineteen o'clock on Friday. Of the plurality of pieces of individual information IM0, only individual information that includes the setting name "tomorrow's weather" and individual information that includes the setting name "national weather" satisfy the condition that the user ID is UID2, the keyword includes "weather forecast", and the current date and time satisfies the printing condition. Therefore, these pieces of individual information are searched for. When the user US2 pronounces "Print a weather forecast" at ten o'clock in the morning on Monday, there is no individual information that satisfies the condition that the user ID is UID2, the keyword includes "weather forecast", and the current date and time satisfies the printing condition.

After having searched for the individual information IM0, the cloud printing service branches the process according to whether there is individual information IM0 satisfying a search condition (S304). When there is no individual information IM0 satisfying the search condition, the cloud printing service issues a request to the voice UI to have it output "No content" by voice from the smart speaker 300 (S306) and terminates the content identification processing. When there is individual information IM0 satisfying the search condition, the cloud printing service acquires the setting name and print setting PS1 from the searched-for individual information IM0 (S308) and also acquires at least one of the acquired-from source information IM2 and content CO1 from the searched-for individual information IM0 (S310). The cloud printing service further branches the process according to whether at least two pieces of individual information IM0 have been searched for (S312). When only one piece of individual information IM0 has been searched for, the cloud printing service issues a request to the voice UI to have it output a setting name by voice from the smart speaker 300 (S314) and terminates the content identification processing. The setting name to be output by voice is the setting name acquired in S308. When at least two pieces of individual information IM0 have been searched for, the cloud printing service issues a request to the voice UI to have it command a selection of a setting name through the smart speaker 300 (S316) and terminates the content identification processing.

Upon the termination of the content identification processing in S212 in FIG. 9, confirmation processing to ask the user US0 about the printing or the like of the content CO1 is performed in S214 to S224. The cloud printing service may accept a setting as to whether to omit confirmation processing in S214 to S224 through the voice UI, voice relay apparatus 400, and smart speaker 300. When confirmation processing is to be omitted, the cloud printing service may cause the process after S212 to proceed to S226.

Confirmation processing in S214 to S224 varies depending on the result of the search for individual information IM0. In a first case described below, confirmation processing is performed when only one piece of individual information IM0 has been searched for.

When the voice UI receives the request to output the extracted setting name by voice, the voice UI outputs, to the voice relay apparatus 400, a request for the smart speaker 300 to output the setting name by voice and to confirm the printing of the content CO1 (S214). For example, the voice UI can request the smart speaker 300 to output the extracted setting name by voice and to output a voice asking for the printing of the content CO1 such as "Will you print". The voice relay apparatus 400 receives the above request and creates a voice signal SG1 matching the request, after which the voice relay apparatus 400 transmits the voice signal SG1 to the smart speaker 300 (S216). Upon receipt of the voice signal SG1, the smart speaker 300 converts it to a voice, and outputs the voice (S218). Thus, the user US0 can confirm the setting name assigned to the content CO1 to be printed and can hear a voice indicating that the content CO1 having the setting name is to be printed. When the user US0 hears the voice and generates a voice such as "Yes" that affirms the printing, the user US0 can cause the printer 200 to print the content CO1 corresponding to the keyword KE0 through the cloud printing service.

The smart speaker 300 receives the voice that affirms printing from the user US0, converts the voice to a voice signal SG1, and transmits the voice signal SG1 to the voice relay apparatus 400 through the network NE1 (S220). The voice relay apparatus 400 receives the voice signal SG1 and analyzes the voice according to the voice signal SG1, after which when a response to the confirmation of printing is included in the voice, the voice relay apparatus 400 passes the response to the voice UI (S222). Upon receipt of the response, the voice UI confirms the response that affirms the printing and passes the response to the cloud printing service (S224). The cloud printing service receives the response and acquires the content CO1 identified in S212 (S226). When the content CO1 is preset in a server computer coupled to the network NE1, processing in S226 may be, for example, processing in which the cloud printing service receives the content CO1 from the server computer through the network NE1. When the content CO1 is present in a portion other than the cloud printing service, the portion being in the information processing apparatus 100, processing in S226 may be, for example, processing in which the cloud printing service reads the content CO1 from the portion other than the cloud printing service, the portion being in the information processing apparatus 100. When the content CO1 is present in the storage section 121 in the cloud printing service, processing in S226 may be, for example, processing in which the cloud printing service writes the content CO1 to the RAM 103.

When at least two pieces of individual information IM0 have been searched for, confirmation processing described below may be performed. For convenience, descriptions will be assigned reference characters S214 to S224 in correspondence with the processing described above.

When the voice UI receives a request to command a selection of an extracted setting name, the voice UI outputs, to the voice relay apparatus 400, a request to output a voice indicating the setting name by voice and to command a selection of the setting name (S214). This request may be to have the smart speaker 300 output a voice indicating a plurality of extracted setting names and output a voice that commands a selection of the content CO1 such as "Will you print which of". Upon receipt of the above request, the voice relay apparatus 400 creates a voice signal SG1 matching the request and transmits the voice signal SG1 to the smart speaker 300 (S216). The smart speaker 300 receives the voice signal SG1, converts the voice signal SG1 to a voice, and outputs the voice (S218). Thus, the user US0 can confirm the setting name assigned to each content CO1 eligible for printing, and can hear a voice commanding a selection of a content CO1. When the user US0 selects a content CO1 in response to the voice and pronounces the setting name corresponding to the selected content CO1, the user US0 can cause, through the cloud printing service, the printer 200 to print the content CO1 that has the selected setting name and corresponds to the keyword KE0.

The smart speaker 300 receives, from the user US0, the voice indicating the setting name, converts the voice to a voice signal SG1, and transmits the voice signal SG1 to the voice relay apparatus 400 through the network NE1 (S220). The voice relay apparatus 400 receives the voice signal SG1 and analyzes the voice according to the voice signal SG1, after which when the setting name is included in the voice, the voice relay apparatus 400 passes the setting name to the voice UI (S222). Upon receipt of the setting name, the voice UI passes the setting name to the cloud printing service (S224). The cloud printing service receives the setting name and selects the content CO1 corresponding to the received setting name from the plurality of contents CO1 identified in S212 (S226).

When there is no individual information IM0 satisfying the search condition, confirmation processing described below may be performed.

The voice UI receives a voice output request to indicate that there is no content, and outputs, to the voice relay apparatus 400, a request to output a voice indicating that there is no content, such as "There is no applicable content" (S214). Upon receipt of the above request, the voice relay apparatus 400 creates a voice signal SG1 matching the request and transmits the voice signal SG1 to the smart speaker 300 (S216). The smart speaker 300 receives the voice signal SG1, converts the voice signal SG1 to a voice, and outputs the voice (S218). Thus, the user US0 can hear a voice indicating that there is no applicable content. The cloud printing service may cancel processing in S226 and subsequent steps.

After having acquired the content CO1, the cloud printing service creates print data DA1 that uses the acquired content CO1 and adds the print setting PS1 acquired in processing in S308 in FIG. 10 to the print data DA1 (S228). Thus the print setting PS1 associated with the identification information UID is linked to the print data DA1. For example, when the content CO1 at the address corresponding to the setting name "today's weather" in FIG. 3 is acquired, print data DA1 used to print the content CO1 is created and the print setting PS1 in individual information IM0 having the setting name "today's weather" is linked to the print data DA1.

After having created the print data DA1, the cloud printing service transmits the print data DA1 and print setting PS1 to the printer 200 through the network NE1 (S230). The printer 200 receives the print data DA1 and print setting PS1 through the network NE1 (S232). The printer 200 then executes printing according to the print data DA1 and print setting PS1 (S234). Thus, the content CO1 matching the voice of the user US0 is printed according to the print setting PS1. In the printing of the content CO1, illustrated in FIG. 3, that has the setting name "today's weather", for example, two copies of the content CO1 are printed in monochrome on A4-size sheets according to the print setting PS1.

After having transmitted the print data DA1, the cloud printing service notifies the voice UI that the printing of the content CO1 has been completed (S236). This notification may be to have the smart speaker 300 output a voice such as "has been printed" together with a voice indicating the setting name of the content CO1. When the voice UI receives the notification of the completion of printing, the voice UI outputs the notification of the completion of printing to the voice relay apparatus 400. When the voice relay apparatus 400 receives the notification of the completion of printing, the voice relay apparatus 400 creates a voice signal SG1 matching the notification and transmits the voice signal SG1 to the smart speaker 300 (S238). Upon receipt of the voice signal SG1, the smart speaker 300 converts the voice signal SG1 to a voice and outputs this voice (S240). Thus, the user US0 can hear a voice indicating that the content CO1 has been printed.

As described above, print data DA1 is created that uses a content CO1 that is associated with an identification information UID and corresponds to the keyword KE0 included in a voice command. The print data DA1 is transmitted from the information processing apparatus 100 to the printer 200. When printing is executed by the printer 200 according to the transmitted print data DA1, printed matter of the content CO1 commanded by a voice of the user US0 is obtained. In this specific example, therefore, an appropriate content matching the user can be printed in response to a voice command. When a plurality of users use the printing system, an appropriate content can be printed for each user in response to a voice command.

5 Variations

Various variations are possible in the present disclosure.

Voice input/output devices to which the present technology can be applied are not limited to smart speakers. The present technology can also be applied to terminals such as smartphones, personal computers, and the like.

Processing described above can be appropriately varied, for example, by changing the sequence. In content identification processing in FIG. 10, processing in S308 and processing in S310 can be exchanged.

Although the permission period T1 is stored in individual information IM0 in FIG. 3, this is not a limitation on the present technology. A content CO1 that is associated with identification information UID and corresponds to a keyword KE0 may be searched for without a permission period T1 being stored in the individual information IM0, regardless of a day of the week and a time slot.

Although a print setting PS1 is stored in individual information IM0 in FIG. 3, this is not a limitation on the present technology. A content CO1 may be printed according to a predetermined print setting, without a print setting PS1 being stored in the individual information IM0.

Acquired-from source information IM2, which represents a source from which the content CO1 was acquired, may be always stored in each piece of individual information IM0. A content CO1 itself may be always stored in each piece of individual information IM0.

A planned location of the user US0 may be associated with a date and time in a schedule table managed by an external schedule table application. In this case, it is preferable, for example, to obtain printed matter of a weather forecast in the planned location of the user US0 at a certain date and time.

First, an example of the structure of management information IM10 managed by an external schedule table application will be described with reference to FIG. 11.

Management information IM10 in FIG. 11 includes a user name, identification information UID of the user US0, user location information IM11 representing the location of the user US0, and schedule table information IM12, in which user location information IM11 representing the planned location of the user US0 is associated with a planned date and time. The location of the user US0 is the address of the user US0, the current location of the user US0, or the planned location of the user US0. Therefore, the management information IM10 is managed by an external application and is associated with identification information UID.

FIG. 12 schematically illustrates date-and-time identification keywords KE1 used to identify a planned date and time. The date-and-time identification keywords KE1 in FIG. 12 include "current" or the like that indicates the current date, "tomorrow", "day after tomorrow", and the like that indicate a date relative to the current date, "Monday", "Tuesday", and the like that indicate a day of the week, "1st", "2nd", and the like that indicate an absolute date, and "1 o'clock", "2 o'clock" and the like that indicate a time of the day.

When, for example, the user US2 pronounces "Print a forecast of weather at 10 o'clock on the 1st", the smart speaker 300 converts a voice from the user US2 to a voice signal SG1 and transmits the voice signal SG1 to the voice relay apparatus 400. The voice relay apparatus 400 analyzes the voice according to the voice signal SG1 to identify the user US2 and extracts "1st" and "10 o'clock", which are date-and-time identification keywords KE1, "weather forecast", which is a keyword KE0, and "print", which is a request keyword. The voice relay apparatus 400 then passes the identification information UID of the user US2, the date-and-time identification keywords KE1 "1st" and "10 o'clock", and the keyword KE0 "weather forecast" to the voice UI. The voice UI outputs a print request to the cloud printing service together with the received information.

FIG. 13 schematically illustrates an example of the structure of the registration table TA1 in which the date-and-time identification keyword KE1 is used. IM2 in FIG. 13 includes information indicating that schedule table information IM12 will be referenced. The keyword KE0 included in individual information IM0 is a variable-content specifying keyword KE2 corresponding to a variable content CO2 illustrated in FIG. 14 and a location-related content specifying keyword KE3 corresponding to a location-related content CO3. The location-related content CO3 is related to a location represented by user location information IM11. The location-related content CO3 is an example of the variable content CO2, which can be varied depending on management information IM10. In the registration table TA1 stored in the storage section 121, registration information IM1 that includes acquired-from source information IM2 that represents a source from which the location-related content CO3 was acquired is stored in correspondence with identification information UID. The location-related content CO3 includes a forecast of weather in a planned location at a planned date and time, traffic information in the planned location at the planned date and time, a map in the planned location, and the like.

Upon receipt of the print request, the cloud printing service searches for individual information IM0 that includes the matching user ID and acquired keyword KE0. When acquired-from source information IM2 in the searched-for individual information IM0 indicates reference to schedule table information IM12, the cloud printing service references schedule table information IM12 in FIG. 11 and acquires a panned location at a planned date and time indicated by the date-and-time identification keywords KE1 "1st" and "10 o'clock". Next, the cloud printing service acquires the location-related content CO3, which is a weather forecast content, in the planned location at the planned date and time according to the address of the acquired-from source information IM2. The cloud printing service then creates print data DA1 that uses this location-related content CO3, and transfers the print data DA1 to the printer 200 through the network NE1. The printer 200 receives the print data DA1 and executes printing according to the print data DA1, printing a content of a forecast of weather in the planned location "Tokyo" at the date and time represented by "1st" and "10 o'clock" the user US2 pronounced.

Individual information IM0 in which schedule table information IM12 is not referenced may be included in the registration table TA1 as illustrated in FIG. 3.

The location-related content CO3 illustrated in FIG. 14 is selected from contents CO31 to CO34 related to various locations according to the location of the user US0. When, for example, the date-and-time identification keyword KE1 "current" and keyword KE0 "weather forecast" are pronounced, the weather forecast content CO31 in the current location "Nagano prefecture" indicated in the schedule table information IM12 is printed as the location-related content CO3. When the date-and-time identification keywords KE1 "1st" and "10 o'clock" and keyword KE0 "weather forecast" are pronounced, the weather forecast content CO32 in the planned location "Tokyo" indicated in the schedule table information IM12 is printed as the location-related content CO3. When the date-and-time identification keywords KE1 are "8th" and "10 o'clock", the weather forecast content CO33 in "Rich prefecture" is printed. When the date-and-time identification keywords KE1 are "15th" and "10 o'clock", the weather forecast content CO34 in "Osak prefecture" is printed. When a keyword indicating the current address is pronounced, the weather forecast content CO31 in "Nagano prefecture" indicated by the current address may be printed.

Of course, even when the location-related content CO3 is traffic information, a map, or the like, it is possible to print the location-related content CO3 related to the location represented by user location information IM11.

In the examples in FIGS. 11 to 14, printed matter of a location-related content CO3 such as for a weather forecast, traffic information, or a map is obtained as a content matching the user's planned location in the schedule table managed by an external schedule table application, in response to a voice command from the user US0. Therefore, the examples in FIGS. 11 to 14 can improve convenience.

Although the registration table TA1 in FIG. 13 includes information about all contents for a weather forecast, traffic information, and a map, this is not a limitation on the present technology. Even if information about part of the contents for a weather forecast, traffic information, and a map is not included in the registration table TA1, the present technology is applicable.

The variable content CO2 that can be varied depending on the management information IM10 may be, for example, a content that can be varied depending on the meeting partner of the user US0.

Conclusion

As described above, various aspects in the present disclosure can provide a technology and the like, the technology enabling an appropriate content matching the user to be printed in response to a voice command. Of course, the basic functions and effects described above can be obtained even from a technology composed of only constituent elements in an independent claim.

It is also possible to practice structures obtained by mutually exchanging structures disclosed in the examples described above or changing combinations of these structures and structures obtained by mutually exchanging structures in known technologies and structures disclosed in the examples described above or changing combinations of these structures. The present disclosure is also applicable to these structures.

What is claimed is:
1. A printing system comprising:
a printing apparatus; and
an information processing apparatus coupled to the printing apparatus through a network;
wherein
the information processing apparatus has
a storage section that stores registration information in correspondence with identification information of a user, the registration information including at least one of a content corresponding to a keyword and acquired-from source information representing a source from which the content was acquired, a keyword acquiring section that acquires the keyword included in a print command by voice and the identification information linked to the keyword from a voice relay apparatus, and a transmitting section that creates print data that uses the content that is associated with the acquired identification information and corresponds to the keyword acquired by the keyword acquiring section, and transmits the print data to the printing apparatus, and the printing apparatus receives the print data and executes printing according to the print data.

2. The printing system according to claim 1, further comprising a registering section that stores the registration information in the storage section, wherein the registering section acquires the registration information in response to a command received from the user through the network, acquires the identification information of the user, and stores the acquired registration information in the storage section in correspondence with the acquired identification information.

3. The printing system according to claim 2, further comprising a terminal coupled to the network, wherein the registering section causes the terminal to execute processing to accept a manipulation to enter the registration information, and acquires the entered registration information from the terminal.

4. The printing system according to claim 2, wherein:

the registering section stores, in the storage section, the registration information that includes a permission period representing at least one of a day of a week on which printing of the content is permitted and a time slot during which printing of the content is permitted; and the transmitting section creates the print data when a current date and time is within the permission period, and does not create the print data when the current date and time is outside the permission period.

5. The printing system according to claim 2, wherein:

the registering section stores, in the storage section, the registration information that includes a print setting used to print the content;

the transmitting section links the print setting associated with the identification information to the print data, and transmits the linked print setting to the printing apparatus; and the printing apparatus receives the print setting and executes printing according to the print data and the print setting.

6. The printing system according to claim 1, wherein:

the content includes a variable content that is variable depending on management information associated with the identification information, the management information being managed by an external application;

the keyword includes a variable-content specifying keyword corresponding to the variable content;

the storage section stores the registration information that includes the acquired-from source information representing a source from which the variable content corresponding to the variable-content specifying keyword was acquired, in correspondence with the identification information; and when the keyword is the variable-content specifying keyword, the transmitting section identifies the variable content to be used in printing, according to the acquired-from source information associated with the identification information and to the management information associated with the identification information, and creates the print data that uses the identified variable content.

7. The printing system according to claim 6, wherein:

the management information includes user location information representing a location of the user;

the variable content includes a location-related content related to a location represented by the user location information;

the variable-content specifying keyword includes a location-related content specifying keyword corresponding to the location-related content; and when the keyword is the location-related content specifying keyword, the transmitting section identifies the location-related content to be used in printing, according to the acquired-from source information associated with the identification information and to the user location information associated with the identification information, and creates the print data that uses the identified location-related content.

8. The printing system according to claim 7, wherein:

the management information includes schedule table information, in which the user location information representing a planned location of the user is associated with a planned date and time; and the location-related content is at least one of a weather forecast in the planned location at the planned date and time, traffic information in the planned location at the planned date and time, and a map in the planned location.

9. A printing method that uses a printing apparatus and an information processing apparatus coupled to the printing apparatus through a network, the method comprising:

a storing step of storing registration information in a storage in correspondence with identification information of a user, the registration information including at least one of a content corresponding to a keyword and acquired-from source information representing a source from which the content was acquired;

a keyword acquiring step of acquiring, in the information processing apparatus, the keyword included in a print command by voice and the identification information linked to the keyword from a voice relay apparatus;

a print data creating step of creating print data that uses the content that is associated with the acquired identification information and corresponds to the keyword acquired in the keyword acquiring step;

a print data transmitting step of transmitting the created print data from the information processing apparatus to the printing apparatus; and a printing step of executing printing on the printing apparatus according to the transmitted print data.

10. An information processing apparatus coupled through a network to a printing apparatus that executes printing according to print data, the information processing apparatus comprising:

a storage that stores registration information in correspondence with identification information of a user, the registration information including at least one of a content corresponding to a keyword and acquired-from source information representing a source from which the content was acquired, a keyword acquiring section that acquires the keyword included in a print command by voice and the identification information linked to the keyword from a voice relay apparatus; and a transmitting section that creates print data that uses the content that is associated with the acquired identification information and corresponds to the keyword acquired by the keyword acquiring section, and transmits the print data to the printing apparatus.

* * * * *